(12) United States Patent
Chen (10) Patent No.: US 6,742,430 B2
(45) Date of Patent: Jun. 1, 2004

(54) CIRCULAR SAWING MACHINE HAVING A HIDDEN-TYPE INFRARED GUIDE DEVICE

(75) Inventor: Ruey Zon Chen, Dali (TW)

(73) Assignee: Rexon Co., Ltd., Taichung Hsien (TW)

( * ) Notice: Subject to any disclaimer, the term of this patent is extended or adjusted under 35 U.S.C. 154(b) by 99 days.

(21) Appl. No.: 10/098,549

(22) Filed: Mar. 18, 2002

(65) Prior Publication Data

US 2003/0172789 A1 Sep. 18, 2003

(51) Int. Cl.$^7$ ................................................ B27B 5/29
(52) U.S. Cl. ..................... 83/520; 83/471.3; 83/522.15; 83/581
(58) Field of Search ............................. 83/522.15, 520, 83/471.3, 581, 521; 30/123, 391

(56) References Cited

U.S. PATENT DOCUMENTS

| | | | | |
|---|---|---|---|---|
| 2,806,492 A | * | 9/1957 | Becker ......................... | 83/520 |
| 4,257,297 A | * | 3/1981 | Nidbella .................. | 83/522.15 |
| 4,836,669 A | * | 6/1989 | Teach .......................... | 33/290 |
| 5,038,481 A | * | 8/1991 | Smith .......................... | 83/520 |
| 5,375,495 A | * | 12/1994 | Bosten et al. ................ | 83/520 |
| 5,461,790 A | * | 10/1995 | Olstowski .................... | 30/391 |
| 5,675,899 A | * | 10/1997 | Webb .......................... | 30/391 |
| 6,578,459 B2 | * | 6/2003 | Waite ..................... | 83/522.15 |
| 2001/0029819 A1 | * | 10/2001 | Okouchi ....................... | 83/520 |
| 2001/0049988 A1 | * | 12/2001 | Ushiwata et al. ............. | 83/520 |
| 2003/0097922 A1 | * | 5/2003 | Chen ........................... | 83/520 |

FOREIGN PATENT DOCUMENTS

DE            29616604     * 11/1996

* cited by examiner

Primary Examiner—Stephen Choi
(74) Attorney, Agent, or Firm—Rosenberg, Klein & Lee (57) ABSTRACT

A circular sawing machine having a hidden-type infrared guide device includes a main frame, a saw base pivotally mounted on the main frame, an infrared guide device, and an operation set. The infrared guide device is mounted on the saw base and includes a slide slidably mounted on the saw base, and an infrared indication lamp mounted on the slide. The slide is formed with an elongated slot. The operation set is mounted on the infrared guide device, and includes a drive plate, a movable pin, and an elastic plate. The movable pin is extended through the elongated slot of the slide and has a first end pivoted with the drive plate, and a second end combined with the elastic plate. The elastic plate is mounted on the movable pin and rested on the slide.

8 Claims, 8 Drawing Sheets

CIRCULAR SAWING MACHINE HAVING A HIDDEN-TYPE INFRARED GUIDE DEVICE

BACKGROUND OF THE INVENTION

1. Field of the Invention

The present invention relates to a circular sawing machine having a hidden-type infrared guide device, and more particularly to a circular sawing machine having a hidden-type infrared guide device, wherein the indication light of the infrared indication lamp of the infrared guide device may be projected on the workpiece placed on the worktable of the main frame, thereby facilitating the operator using the circular sawing machine to cut the workpiece.

2. Description of the Related Art

A conventional circular sawing machine is a tool that may be used to cut a workpiece such as the wood or the like. The conventional circular sawing machine comprises a work table formed with an elongated slit, a saw seat pivotally mounted on the work table, and provided with a saw blade. Thus, when the saw seat is pivoted downward to approach the work table, the saw blade may pass through the elongated slit of the work table.

When in use, one hand of the operator has to hold the workpiece on the work table, and the other hand of the operator has to press the saw seat downward. When the saw blade approaches the surface of the workpiece, the operator has to visually inspect if the saw blade aligns with the position to be cut. The operator has to move the workpiece if the saw blade does not align with the position to be cut, so that the operator has to align the saw blade with the position to be cut continuously and repeatedly, thereby wasting much time. In addition, the operator's face has to approach the saw seat to obtain a more exact result, thereby easily causing danger to the operator. Further, when the saw blade approaches the surface of the workpiece, the saw blade is very easy to touch the surface of the workpiece unintentionally, thereby producing unnecessary dents on the surface of the workpiece.

Another conventional circular sawing machine is provided with an infrared guide device to provide an indication effect. However, the infrared guide device is fixed on the saw seat, and is protruded outward from the saw seat, so that the infrared guide device is easily damaged or broken due to hit of a foreign object, thereby affecting the exactness of the infrared guide device in use.

SUMMARY OF THE INVENTION

The present invention has arisen to mitigate and/or obviate the disadvantage of the conventional circular sawing machine having an infrared guide device.

The primary objective of the present invention is to provide a circular sawing machine having a hidden-type infrared guide device, wherein the indication light of the infrared indication lamp of the infrared guide device may be projected on the workpiece placed on the worktable of the main frame, thereby facilitating the operator using the circular sawing machine to cut the workpiece.

Another objective of the present invention is to provide a circular sawing machine having a hidden-type infrared guide device, wherein the slide may be hidden in the seat, and may be exposed outward from the seat by operation of the operation set, so that the infrared indication lamp of the infrared guide device may also be hidden in the seat, and may be exposed outward from the seat by control of the slide.

A further objective of the present invention is to provide a circular sawing machine having a hidden-type infrared guide device, wherein the infrared indication lamp of the infrared guide device may be hidden in the seat when not in use, thereby preventing the infrared indication lamp of the infrared guide device from being damaged or broken due to hit of a foreign object, so as to protect the infrared indication lamp of the infrared guide device, and to maintain the exactness of the infrared indication lamp of the infrared guide device in use.

A further objective of the present invention is to provide a circular sawing machine having a hidden-type infrared guide device, wherein the infrared indication lamp of the infrared guide device may be exposed outward from the seat easily and quickly by movement of the slide, thereby facilitating the operator employing the infrared indication lamp of the infrared guide device.

In accordance with the present invention, there is provided a circular sawing machine having a hidden-type infrared guide device, comprising:

a main frame, provided with a worktable;

a saw base, pivotally mounted on the main frame, and provided with a blade;

an infrared guide device, mounted on the saw base, and including a slide slidably mounted on the saw base, and an infrared indication lamp mounted on the slide, the slide formed with an elongated slot; and an operation set, mounted on the infrared guide device, and including a drive plate, a movable pin, and an elastic plate, the movable pin extended through the elongated slot of the slide and having a first end pivoted with the drive plate, and a second end combined with the elastic plate, the elastic plate mounted on the movable pin and rested on the slide.

Preferably, the saw base is provided with an upper blade guard, and the infrared guide device is mounted on the upper blade guard of the saw base.

Preferably, the infrared guide device further includes a hollow seat for receiving the slide therein. The seat of the infrared guide device has a distal end formed with an opening for facilitating exposure of the slide. The seat of the infrared guide device has an outer surface formed with a concave mounting space for receiving the drive plate and the movable pin of the operation set.

Preferably, the operation set further includes a press block mounted on the movable pin, and rested on an inner face of the drive plate. Preferably, the inner face of the drive plate is provided with a cam portion.

Preferably, the slide is formed with a receiving chamber for receiving the infrared indication lamp.

Further benefits and advantages of the present invention will become apparent after a careful reading of the detailed description with appropriate reference to the accompanying drawings.

DETAILED DESCRIPTION OF THE INVENTION

Figure 1:
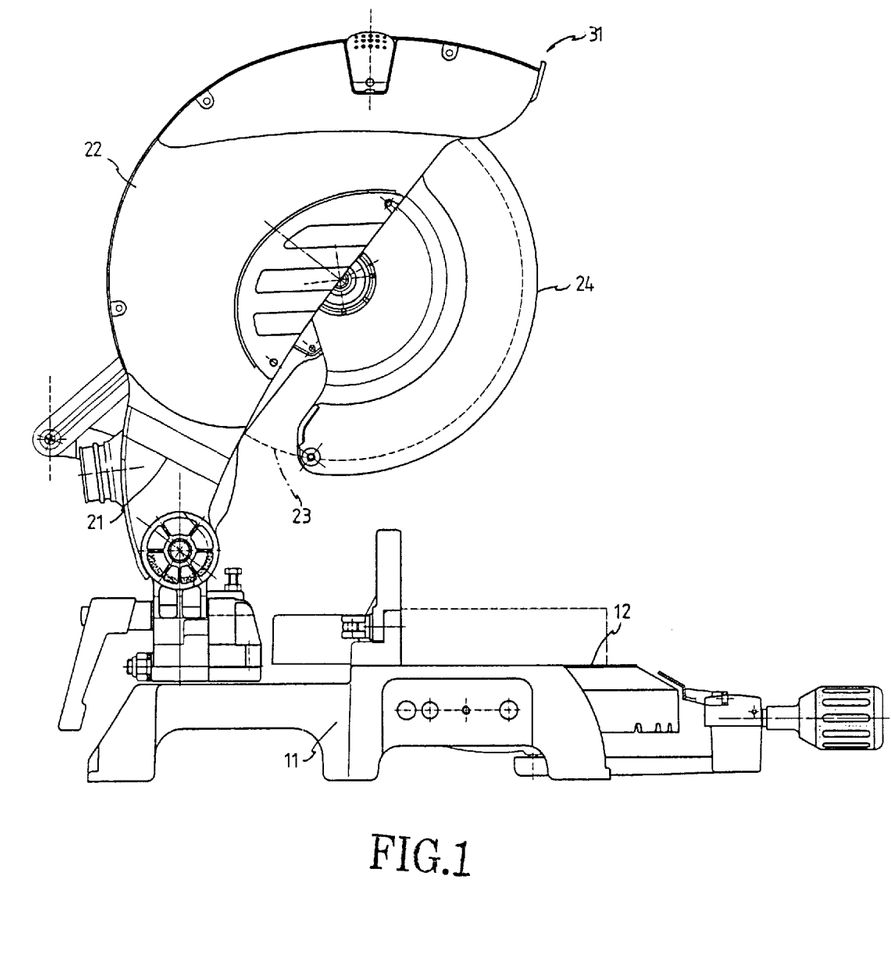
FIG. 1 is a side plan view of a circular sawing machine having a hidden-type infrared guide device in accordance with a preferred embodiment of the present invention.

Referring to the drawings and initially to FIG. 1, a circular sawing machine having a hidden-type infrared guide device in accordance with a preferred embodiment of the present invention comprises a main frame 11, a saw base 21, an infrared guide device 31, and an operation set 41.

The main frame 11 is mounted on the ground or other location, and has a surface provided with a worktable 12.

The saw base 21 is pivotally mounted on the main frame 11, and includes an upper blade guard 22 pivotally mounted on the main frame 11, a blade 23 rotatably mounted in the upper blade guard 22, and a retractable blade guard 24 pivotally mounted on the upper blade guard 22. When the saw base 21 is pivoted toward the worktable 12 of the main frame 11, the retractable blade guard 24 may be hidden into the upper blade guard 22 automatically, to partially expose the blade 23 to mate with the worktable 12 of the main frame 11 for cutting a workpiece.

Figure 2:
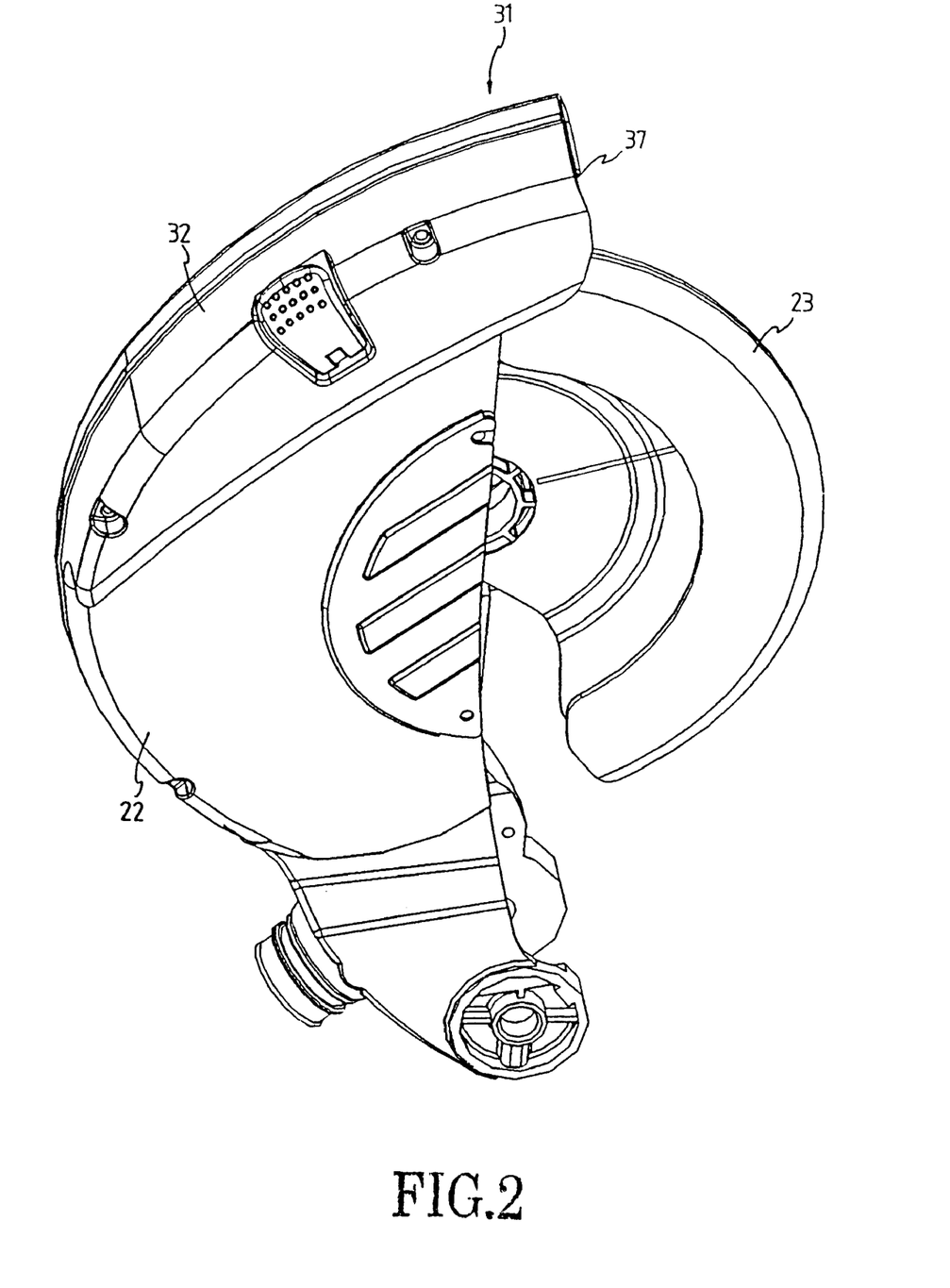
FIG. 2 is a perspective assembly view of a circular sawing machine having a hidden-type infrared guide device in accordance with a preferred embodiment of the present invention.
Figure 3:
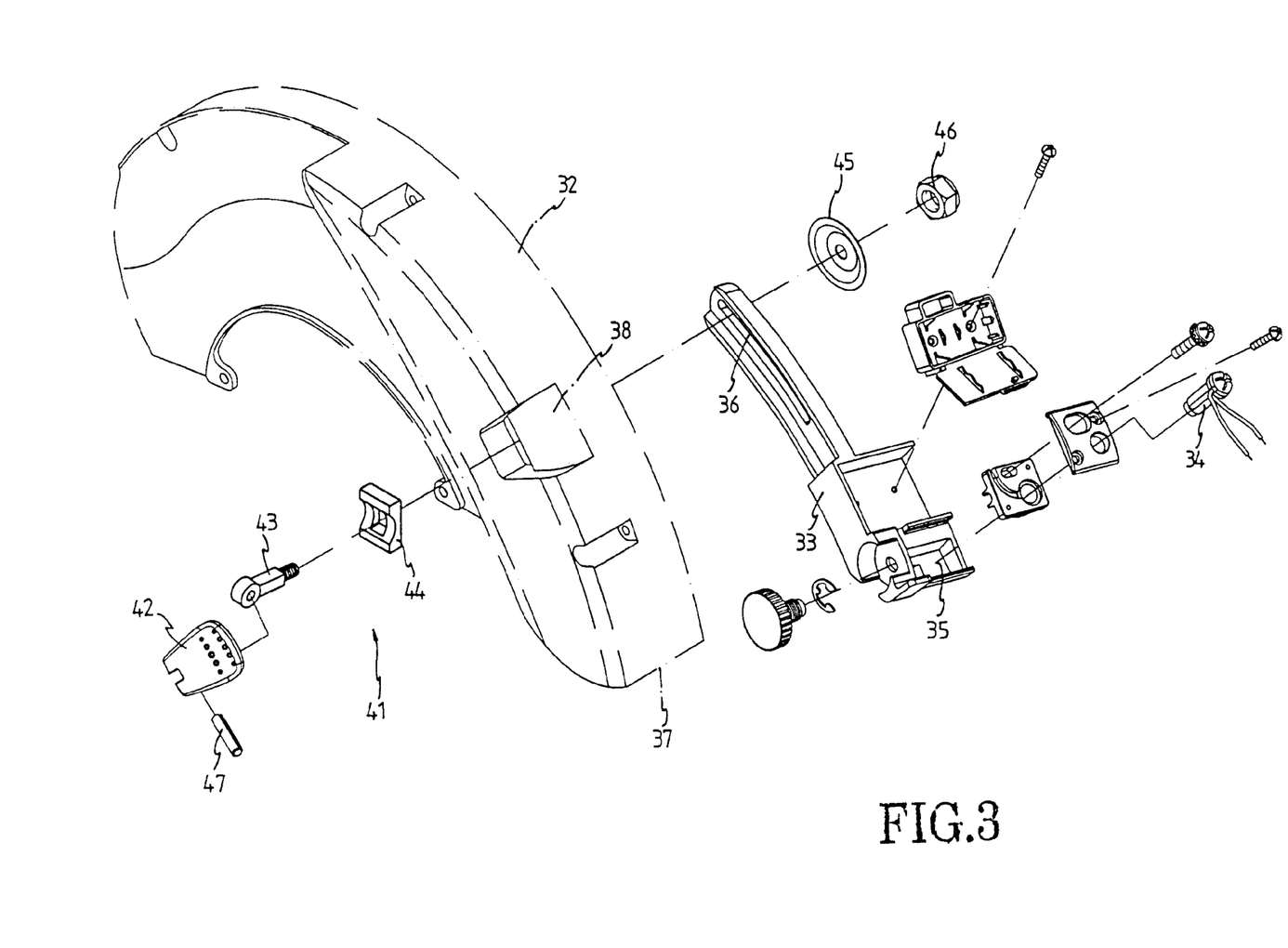
FIG. 3 is an exploded perspective view of the circular sawing machine having a hidden-type infrared guide device as shown in FIG. 2.

Referring to FIGS. 2 and 3, the infrared guide device 31 is mounted on the upper blade guard 22 of the saw base 21, and includes a seat 32, a slide 33, and an infrared indication lamp 34.

The seat 32 is made to have a shade shape. The seat 32 is secured on the upper blade guard 22, and has a distal end formed with an opening 37 which is located adjacent to the retractable blade guard 24.

The slide 33 is slidably mounted in the seat 32, and has a first end formed with a receiving chamber 35, and a second end formed with an elongated slot 36. The receiving chamber 35 of the slide 33 faces the opening 37 of the seat 32.

The infrared indication lamp 34 is mounted in the receiving chamber 35 of the slide 33, and may provide a linear indication mark. The infrared indication lamp 34 may freely swivel in the receiving chamber 35 of the slide 33, so as to adjust the angle and orientation of the linear indication mark.

Figure 4:
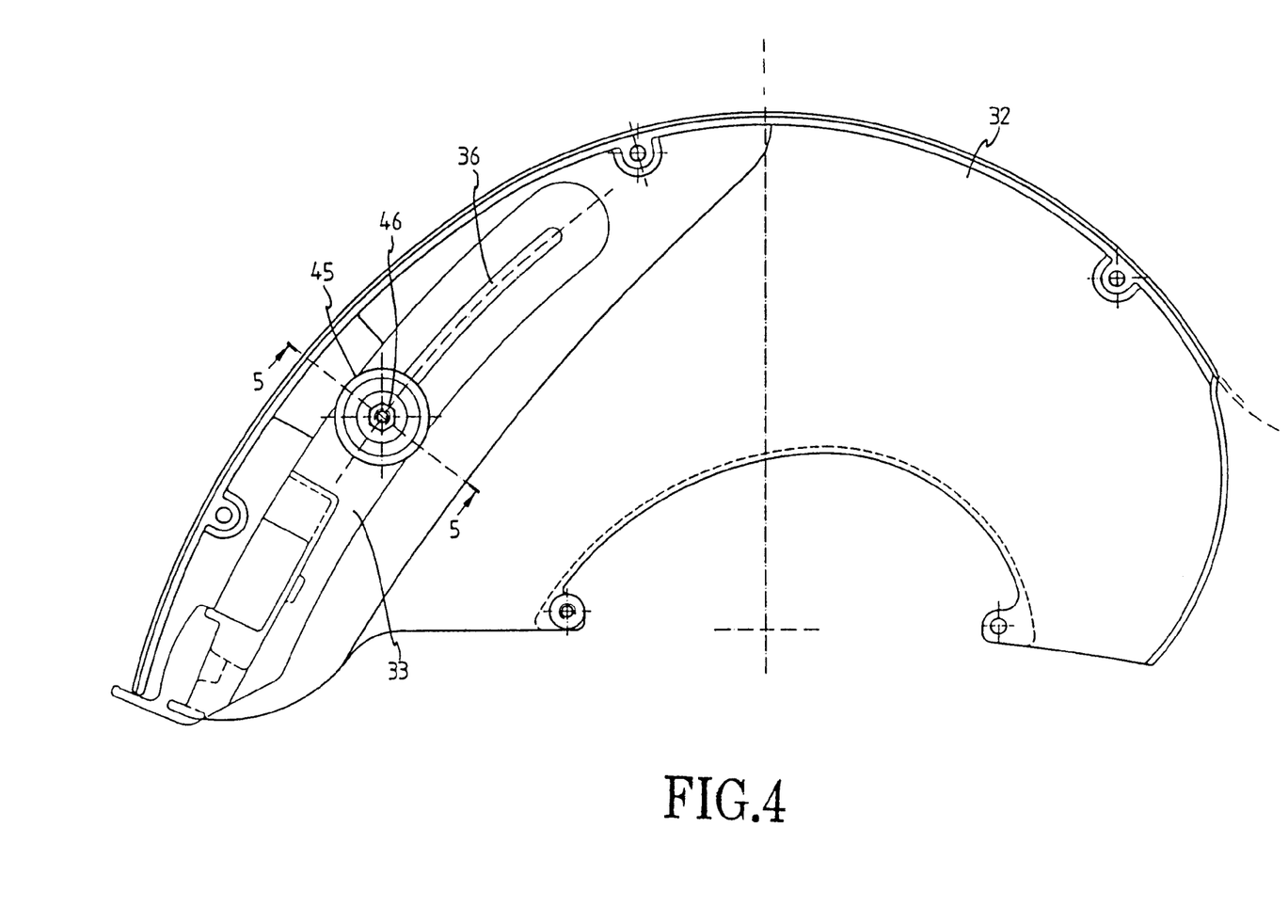
FIG. 4 is a side plan assembly view of the circular sawing machine having a hidden-type infrared guide device as shown in FIG. 3.
Figure 5:
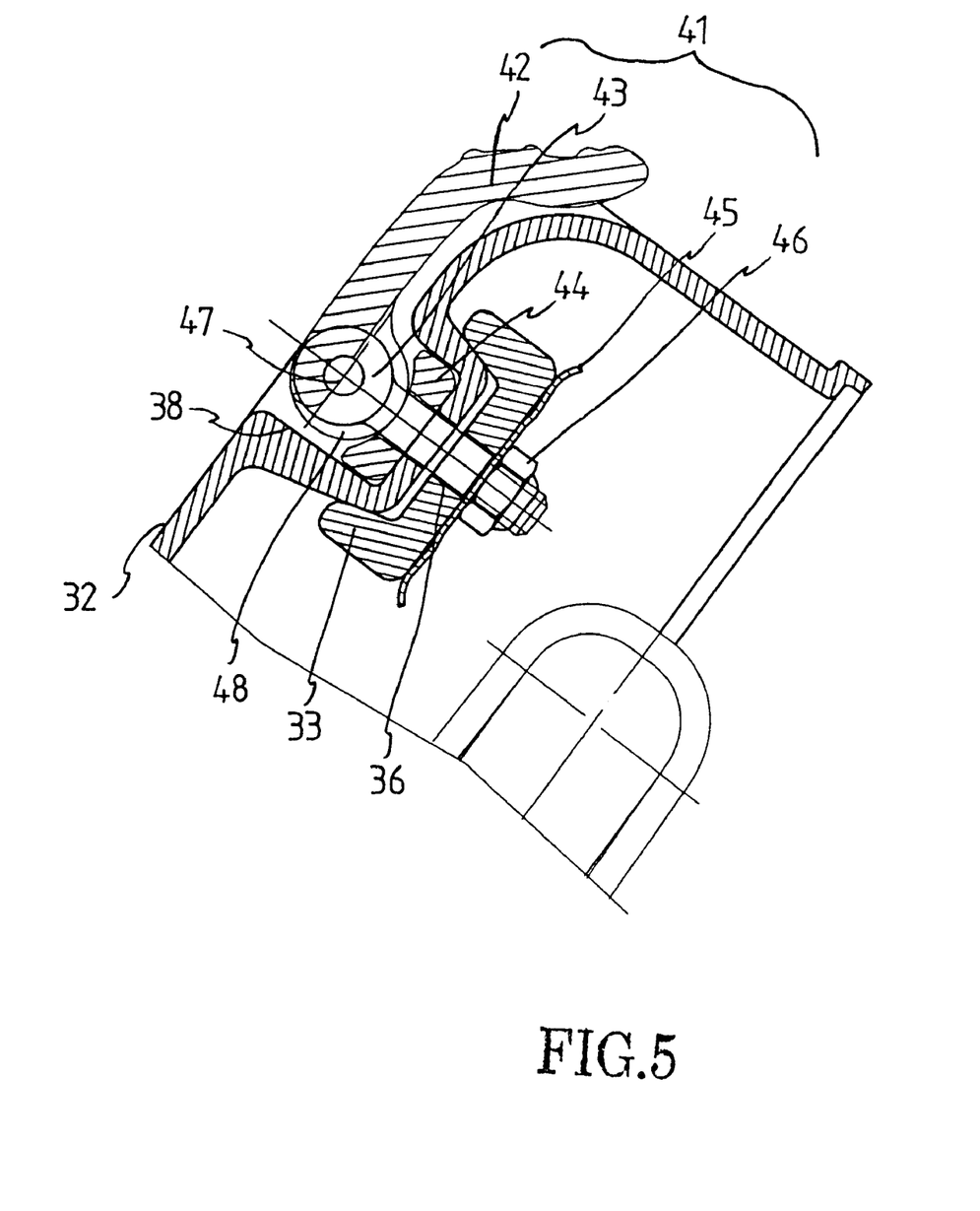
FIG. 5 is a cross-sectional view of the circular sawing machine having a hidden-type infrared guide device taken along line 5—5 as shown in FIG. 4.

Referring to FIGS. 3–5, the operation set 41 is a set of quick release assembly, and is mounted on the seat 32 of the infrared guide device 31. The operation set 41 includes a drive plate 42, a movable pin 43, a press block 44, an elastic plate 45, and a fixing member 46. The drive plate 42 is pivoted with the movable pin 43 by a shaft 47. The drive plate 42 has an inner face provided with a cam portion 48. The press block 44 is mounted on the movable pin 43, and is rested on the cam portion 48. The drive plate 42, the movable pin 43 and the press block 44 are mounted on an outer surface of the seat 32 of the infrared guide device 31. The outer surface of the seat 32 of the infrared guide device 31 is formed with a concave mounting space 38 for receiving the drive plate 42, the movable pin 43 and the press block 44.

After the drive plate 42, the movable pin 43 and the press block 44 are mounted in the mounting space 38 of the outer surface of the seat 32 of the infrared guide device 31, the press block 44 is rested on an inner face of the mounting space 38, and the movable pin 43 is in turn extended through the seat 32 and through the elongated slot 36 of the slide 33.

The elastic plate 45 is mounted on the movable pin 43, and is rested on the slide 33. The fixing member 46 is locked on the movable pin 43 for retaining and fixing the elastic plate 45.

As shown in FIG. 5, the slide 33 is entirely hidden in the seat 32. At this time, the cam 48 of the drive plate 42 has one side having a longer radius rested on the press block 44. During the contact process of the cam 48 and the press block 44, the movable pin 43 is moved outward, thereby moving the elastic plate 45 to closely and tightly press and urge the slide 33, so as to position the slide 33 on the seat 32 securely, thereby preventing the slide 33 from detaching from the opening 37 of the seat 32.

Figure 6:
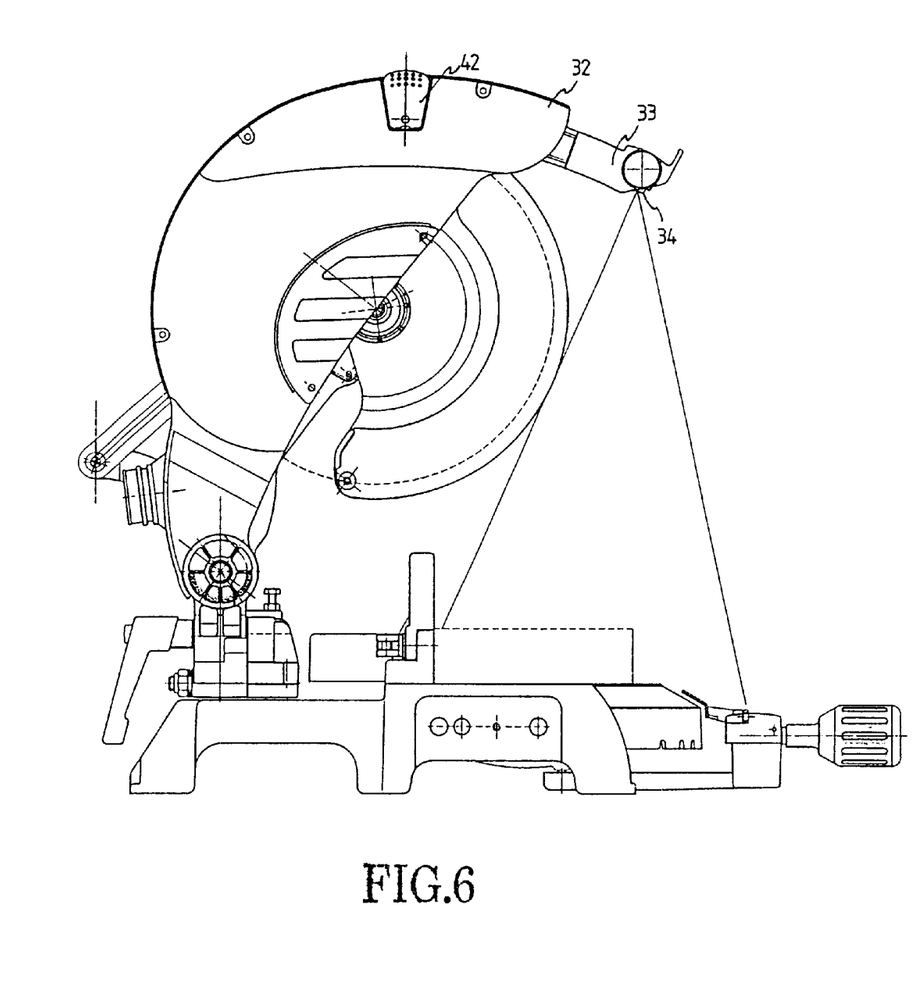
FIG. 6 is a schematic operational view of the circular sawing machine having a hidden-type infrared guide device as shown in FIG. 1 in use.
Figure 7:
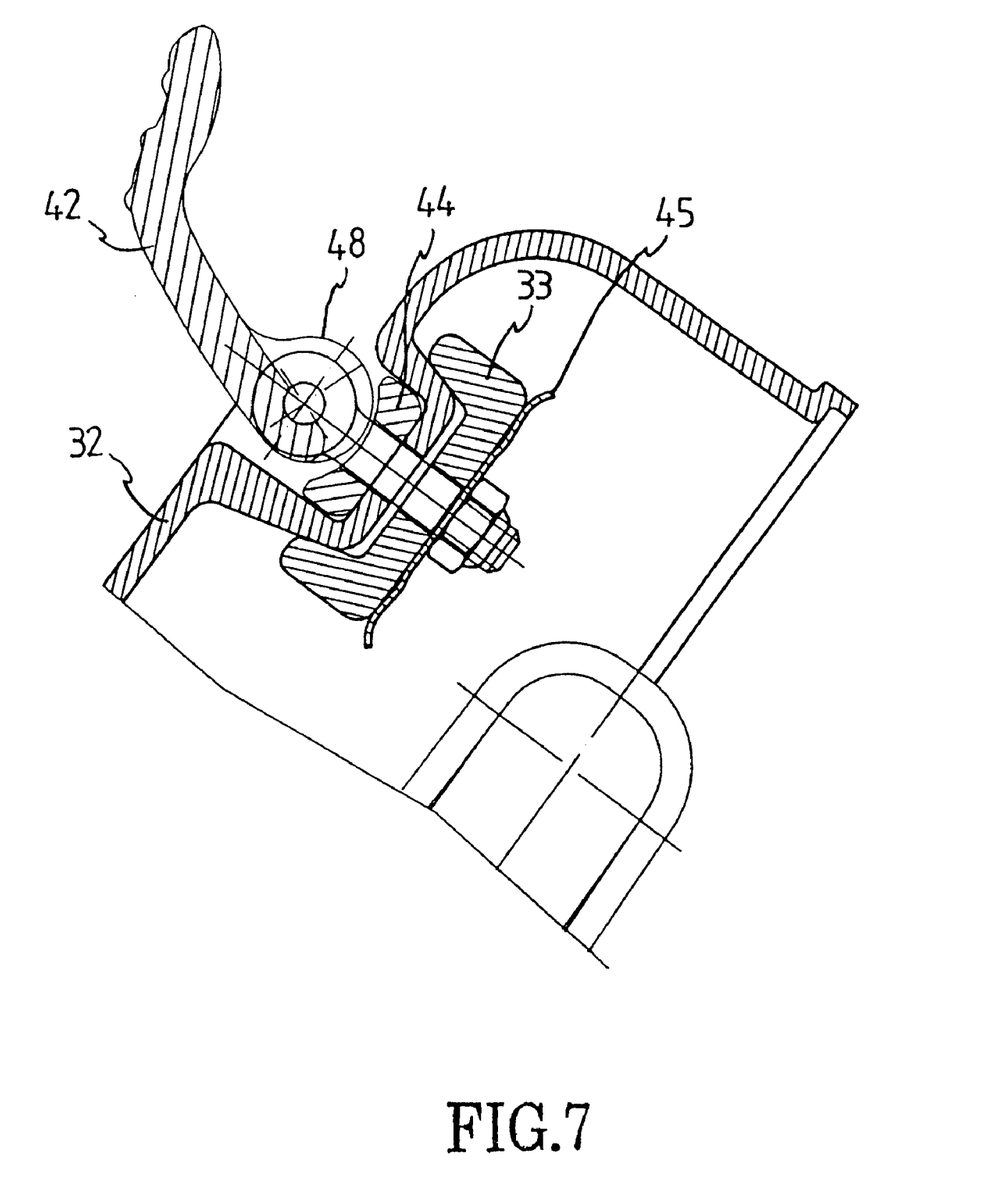
FIG. 7 is a schematic operational view of the circular sawing machine having a hidden-type infrared guide device as shown in FIG. 5 in use.
Figure 8:
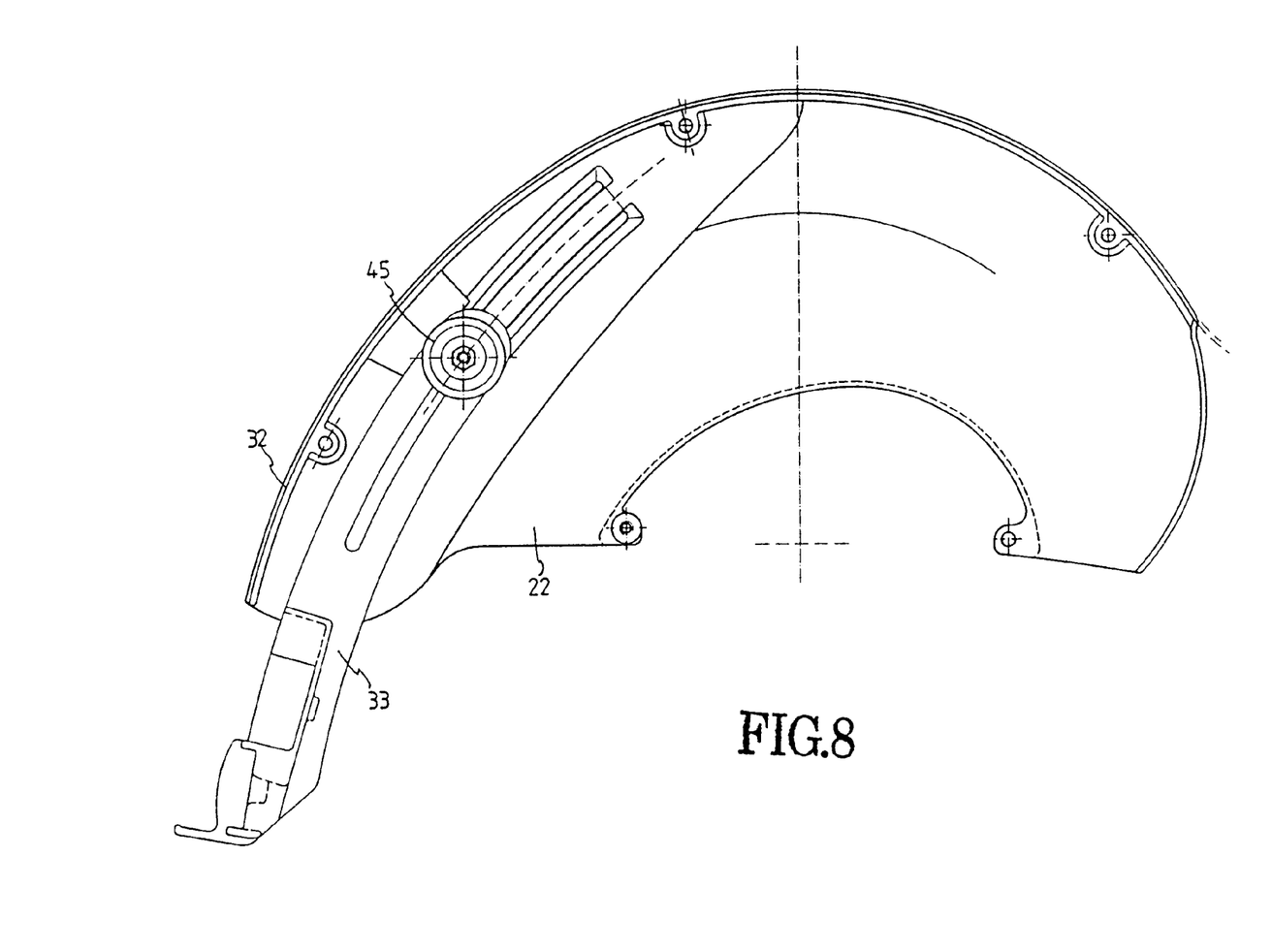
FIG. 8 is a schematic operational view of the circular sawing machine having a hidden-type infrared guide device as shown in FIG. 4 in use.

Referring to FIGS. 6–8, when the drive plate 42 is pivoted outward from the position as shown in FIG. 5 to the position as shown in FIG. 7, the side of the cam 48 of the drive plate 42 having a longer radius is detached from the press block 44, and the cam 48 of the drive plate 42 has another side having a smaller radius rested on the press block 44.

At this time, the urging force of the drive plate 42 applied on the elastic plate 45 is removed, and the elastic plate 45 may be returned to its original position by the restoring force, so that the urging force of the elastic plate 45 applied on the slide 33 is released. Thus, the slide 33 may be freely moved outward from the seat 32 as shown in FIGS. 6 and 8, and the indication light of the infrared indication lamp 34 of the infrared guide device 31 may be projected on the workpiece placed on the worktable 12 of the main frame 11 as shown in FIG. 6, thereby facilitating the operator using the circular sawing machine to cut the workpiece.

Accordingly, in the circular sawing machine having a hidden-type infrared guide device in accordance with a preferred embodiment of the present invention, the slide 33 may be hidden in the seat 32, and may be exposed outward from the seat 32 by operation of the operation set 41, so that the infrared indication lamp 34 of the infrared guide device 31 may also be hidden in the seat 32, and may be exposed outward from the seat 32 by control of the slide 33. Thus, the infrared indication lamp 34 of the infrared guide device 31 may be hidden in the seat 32 when not in use, thereby preventing the infrared indication lamp 34 of the infrared guide device 31 from being damaged or broken due to hit of a foreign object, so as to protect the infrared indication lamp 34 of the infrared guide device 31, and to maintain the exactness of the infrared indication lamp 34 of the infrared guide device 31 in use. In addition, the infrared indication lamp 34 of the infrared guide device 31 may be exposed outward from the seat 32 easily and quickly by movement of the slide 33, thereby facilitating the operator employing the infrared indication lamp 34 of the infrared guide device 31.

Although the invention has been explained in relation to its preferred embodiment as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A circular sawing machine having a hidden-type infrared guide device, comprising:

a main frame, provided with a worktable;

a saw base, pivotally mounted on the main frame, and provided with a blade;

an infrared guide device, mounted on the saw base, and including a slide slidably mounted on the saw base, and an infrared indication lamp mounted on the slide to move therewith, the slide being formed with an elongated slot; and an operation set, mounted on the infrared guide device, and including a drive plate, a movable pin, and an elastic plate, the drive plate pivotally mounted on a first end of the movable pin, the movable pin extended through the elongated slot of the slide and having a second end combined with the elastic plate, the elastic plate mounted on the movable pin and rested on the slide.

2. The circular sawing machine having a hidden-type infrared guide device in accordance with claim 1, wherein the saw base is provided with an upper blade guard, and the infrared guide device is mounted on the upper blade guard of the saw base.

3. The circular sawing machine having a bidden-type infrared guide device in accordance with claim 1, wherein the infrared guide device further includes a hollow scat secured on an upper blade guard of the saw base for receiving the slide therein so that the slide is fully hidden in an inner surface of the seat when the infrared guide device is not in use.

4. The circular sawing machine having a hidden-type infrared guide device in accordance with claim 3, wherein the seat of the infrared guide device has a distal end formed with an opening for facilitating exposure of the slide when the infrared guide device is in use.

5. The circular sawing machine having a hidden-type infrared guide device in accordance with claim 3, wherein the seat of the infrared guide device has an outer surface formed with a concave mounting space for receiving the drive plate and the movable pin of the operation set.

6. The circular sawing machine having a hidden-type infrared guide device in accordance with claim 1, wherein the operation set further includes a press block mounted on the movable pin, and rested on the inner face of the drive plate.

7. The circular sawing machine having a hidden-type infrared guide device in accordance with claim 6, wherein the inner face of the drive plate is provided with a cam portion rested on the press block.

8. The circular sawing machine having a hidden-type infrared guide device in accordance with claim 1, wherein the slide is formed with a receiving chamber for receiving the infrared indication lamp.

* * * * *